Aug. 1, 1961 L. P. TISCHLER 2,994,321
PUNCH
Filed Feb. 26, 1958
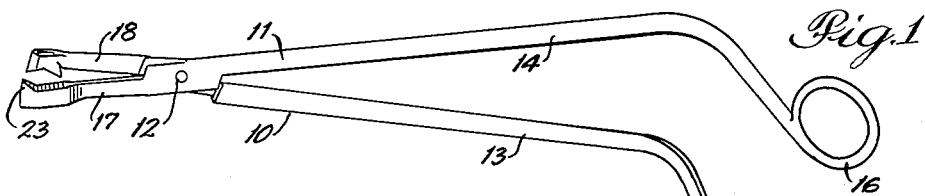
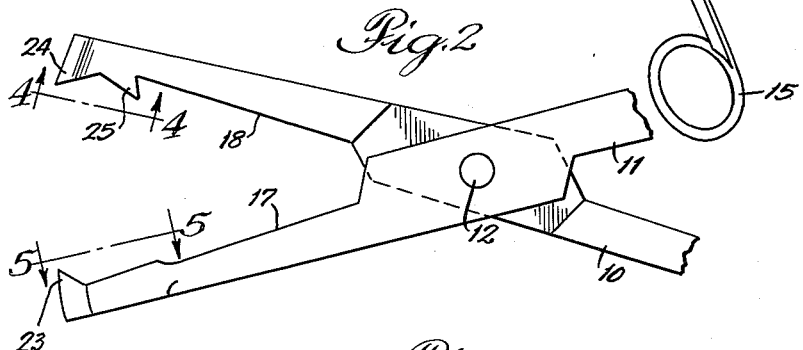
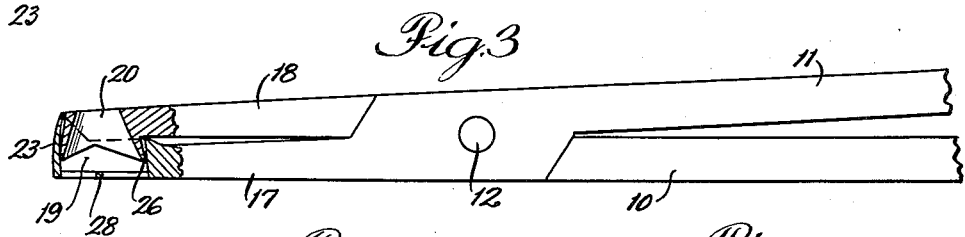
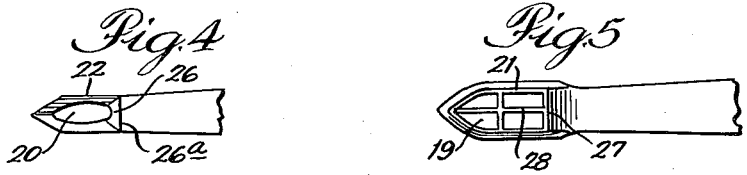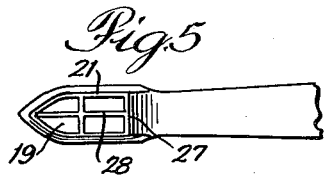
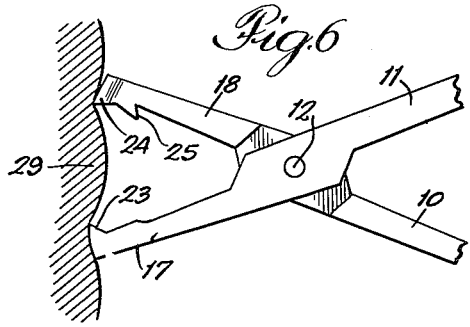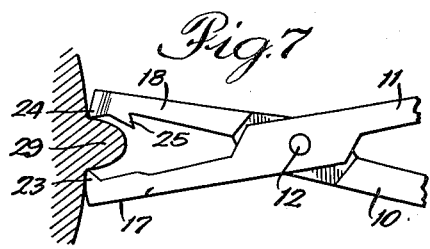
INVENTOR:
Louis P. Tischler,
BY Davern, Tilton, Fallon & Lungmus,
ATTORNEYS.

United States Patent Office 2,994,321
Patented Aug. 1, 1961

2,994,321
PUNCH
Louis P. Tischler, Schenectady, N.Y., assignor to V. Mueller & Company, a corporation of Illinois
Filed Feb. 26, 1958, Ser. No. 717,612
6 Claims. (Cl. 128—2)

This invention relates to a punch, and more specifically, to an improved biopsy punch especially suited for use in obtaining biopsy specimens.

Although biopsy punches are commercially available in a variety of shapes and constructions to facilitate the taking of tissue samples from different parts of the body varying in location and accessibility, such instruments all have in common a pair of jaws with opposing peripheral cutting edges for cutting and removing selected portions of the particular tissues intended for microscopic examination. Generally, the punches are constructed so that the edges of the respective jaws slidably engage each other to perform a clean cutting or punching operation.

A frequent problem in the use of present biopsy punches lies in the tendency of tissues, especially those tissues covered with a mucous lining, to slip outwardly from between the closing jaws of the instrument. To avoid this, an additional instrument such as a tenaculum is frequently employed to hold the tissue in place during the punching operation. It is apparent that the necessity of using a tenaculum serves to complicate the procedure and, in some instances, may cause considerable inconvenience and difficulty. Furthermore, even where a tenaculum is used, the punch may have to be urged against the tissue with an undesirable amount of force in order to further reduce the likelihood that the tissue will slip outwardly and escape from between the jaws as they are closed.

Therefore, one of the main objects of the present invention is to overcome the aforementioned defects and disadvantages of present biopsy punches. Another object is to provide a biopsy punch which will securely grip a selected portion of the tissue from which the specimen is to be taken while the jaws are spread apart and will urge that portion of the tissue between the cutting edges of the jaws as they are closed. A further object is to provide a punch forceps which is particularly adapted for punching tissue specimens of uniform size and shape, and which may be easily manipulated to take such specimens without exerting undue pressure on the body part and without requiring the use of a tenaculum.

Other objects will appear from the specification and drawings in which:

FIGURE 1 is a perspective view of a punch embodying the present invention; FIGURE 2 is an enlarged broken side elevation of the jaws of the punch, the jaws being shown in open position; FIGURE 3 is an enlarged broken side elevation of the punch illustrating the jaws in closed position, the jaws being shown partly in section for the purpose of illustrating structural details of the invention; FIGURE 4 is a broken plan view of the upper jaw taken along line 4—4 of FIGURE 2; FIGURE 5 is a broken plan view of the lower jaw of the punch taken along line 5—5 of FIGURE 2; FIGURE 6 is a broken side elevation showing the bioptic punch at the commencement of a punching operation; and FIGURE 7 is a broken side view illustrating the operation of the punch as the jaws are moved towards a fully closed position.

Referring to the embodiment of my invention illustrated in the drawings, FIGURE 1 shows a biopsy punch forceps composed of a pair of members 10 and 11 hingedly connected to each other by a pin 12. The elongated shanks 13 and 14 of hinged members 10 and 11 respectively extend rearwardly from the point of pivotal connection and are provided at their ends with finger openings 15 and 16.

If desired, the shanks may be curved so that the operator's vision will not be obstructed by his hand during the taking of a biopsy specimen. The punch forceps may be formed from stainless steel or any other suitable material.

Extending forwardly from the pivot point are a pair of jaws, designated herein as lower jaw 17 and upper jaw 18 for the purpose of simplifying description of the invention. Adjacent the free ends of the respective jaws are a pair of openings 19 (FIGURE 5) and 20 (FIGURE 4) which extend generally in the direction of jaw movement and which are in register with each other when the jaws are closed. The jaws have opposing cutting edges 21 and 22 extending about the periphery of the respective openings or recesses and, as indicated in FIGURE 3, these edges are adapted for slidably engaging each other to perform a clean cutting operation as the jaws are moved into closed position.

At the forward end of the lower jaw is a beak 23 which tapers forwardly and upwardly or inwardly to provide a sharp point. Similarly, the upper jaw has at its forward end a forwardly and downwardly or inwardly tapered beak 24 which is telescopically received within the tapered front portion of the opening 19 when the jaws are closed. Since cutting edges 21 and 22 continue along the opposing edges of the beaks 23 and 24, it is apparent that a cutting action initiates at the points of the opposing beaks when the jaws of the instrument are closed.

In the illustration given, upper jaw 18 is also equipped with a rear beak 25 which tapers downwardly and rearwardly (as viewed in elevation) but, unlike front beak 24, provides a downwardly inclined transverse rear wall 26. This rear wall terminates in a transverse cutting edge 26a which constitutes a portion of the peripheral cutting edge 22. Upon closing of the jaws edge 26a contacts the opposing edge portion 27 of the lower jaw's cutting edge 21 immediately after the opposing front beaks 23 and 24 engage each other.

Preferably, lower jaw 17 is provided with a grid 28 at the outer end of the opening 19 to prevent a specimen from falling through that opening after a punching operation. Also, as shown most clearly in FIGURE 3, opening 20 of the upper jaw is tapered upwardly or outwardly to restrain movement of the tissue sample therethrough.

The operation of the punch forceps in the taking of a biopsy specimen is illustrated in FIGURES 6 and 7 of the drawings. In FIGURE 6, it will be noted that when the jaws of the punch are spread apart, beaks 23 and 24 angle forwardly so that their pointed ends will readily engage and grip a selected portion of the tissue 29 therebetween. Then, as the jaws are closed the tissue portion is folded and is drawn inwardly between the cutting edges 21 and 22 of the jaws. Upon further closing movement of the jaws, the folded portion of tissue tends to engage the rearwardly inclined wall of rear beak 25 so that displacement of the tissue behind edges 26 and 27 is restrained. Cutting or punching then commences along the opposing edges of the front beaks and continues along edges 21 and 22 until the specimen is completely free from the surrounding tissue.

Since the pointed beaks 23 and 24 firmly grip the tissue wall and fold a portion of that tissue between the cutting edges as the jaws are closed, the use of a tenaculum or other instrument for holding the tissue and for guiding it between the jaws is rendered unnecessary. Furthermore, in view of the secure grip upon the tissue by the pointed front beaks, a biopsy specimen may be easily and quickly obtained upon the application of only very slight pressure against the surface from which the specimen is to be taken.

While in the foregoing I have disclosed an embodiment of my invention in considerable detail for purposes of illustration, it will be understood by those skilled in the art that many of these details may be varied considerably without departing from the spirit and scope of the invention.

I claim:

1. A punch for cutting and removing tissue specimens for bioptic examination, said punch having a pair of opposing jaws mounted for movement towards and away from each other, each of said jaws having a recess therein extending in the direction of jaw movement, said jaws also having cutting edges extending about said recesses and being provided with opposing telescoping beaks at the free ends thereof directly in front of said recesses, the beaks of each of said jaws having pointed ends and extending generally towards each other in the direction of jaw movement for gripping a tissue when said jaws are open and for drawing said tissue between the cutting edges of the jaws and into said recesses as the jaws are closed.

2. The structure of claim 1 in which at least one of said jaws is also provided behind the recess thereof with a rear beak for limiting the rearward movement of said tissue between the jaws as said jaws are closed.

3. In a punch for taking biopsy specimens, a pair of hinged jaws movable between open and closed positions, said jaws having recesses therein extending in the direction of jaw movement and being disposed in alignment when said jaws are closed, said jaws also having opposing cutting edges extending about the periphery of said recesses, and a pair of opposing, telescoping beaks provided at the free front ends of said jaws and having pointed ends for gripping a tissue and for drawing the same between the cutting edges of the jaws as the jaws are moved from open into closed positions.

4. The structure of claim 3 in which one of said jaws is provided with a rear beak for limiting rearward movement of said tissue between said jaws as the jaws are closed.

5. In a forceps punch for taking bioptic specimens, a pair of hinged jaws movable between open and closed positions, said jaws having a pair of openings extending in the direction of jaw movement and being aligned with each other when said jaws are closed, said jaws having cutting edges extending continuously about each of said openings, said cutting edges of the respective jaws being frictionally and slidably engageable with each other for cutting a tissue disposed therebetween, said jaws also having at the forward ends thereof a pair of opposing and telescoping beaks, said beaks each being tapered forwardly and inwardly and having opposing cutting edge portions continuous with the cutting edges of the respective jaws.

6. In a punch for taking biopsy specimens, a pair of hinged jaws movable between open and closed positions, at least one of said jaws having a recess therein extending in the direction of jaw movement, said one of said jaws having cutting edges extending about the periphery of said recess, the other of said jaws having an end portion thereof receivable within said recess and having cutting edges engageable with the walls of said recess when said jaws are closed, and a pair of opposing telescoping beaks provided at the free front ends of said jaws and having pointed ends for gripping a tissue and for drawing the same between the cutting edges of the jaws as the jaws are moved from open into closed positions.

References Cited in the file of this patent

UNITED STATES PATENTS

| 2,646,799 | Jacoby | July 28, 1953 |
| 2,778,357 | Leibinger et al. | Jan. 22, 1957 |

FOREIGN PATENTS

| 200,355 | Germany | Nov. 5, 1907 |
| 396,253 | France | Apr. 6, 1909 |
| 478,856 | Italy | Mar. 5, 1953 |